United States Patent Office 3,306,037
Patented Feb. 28, 1967

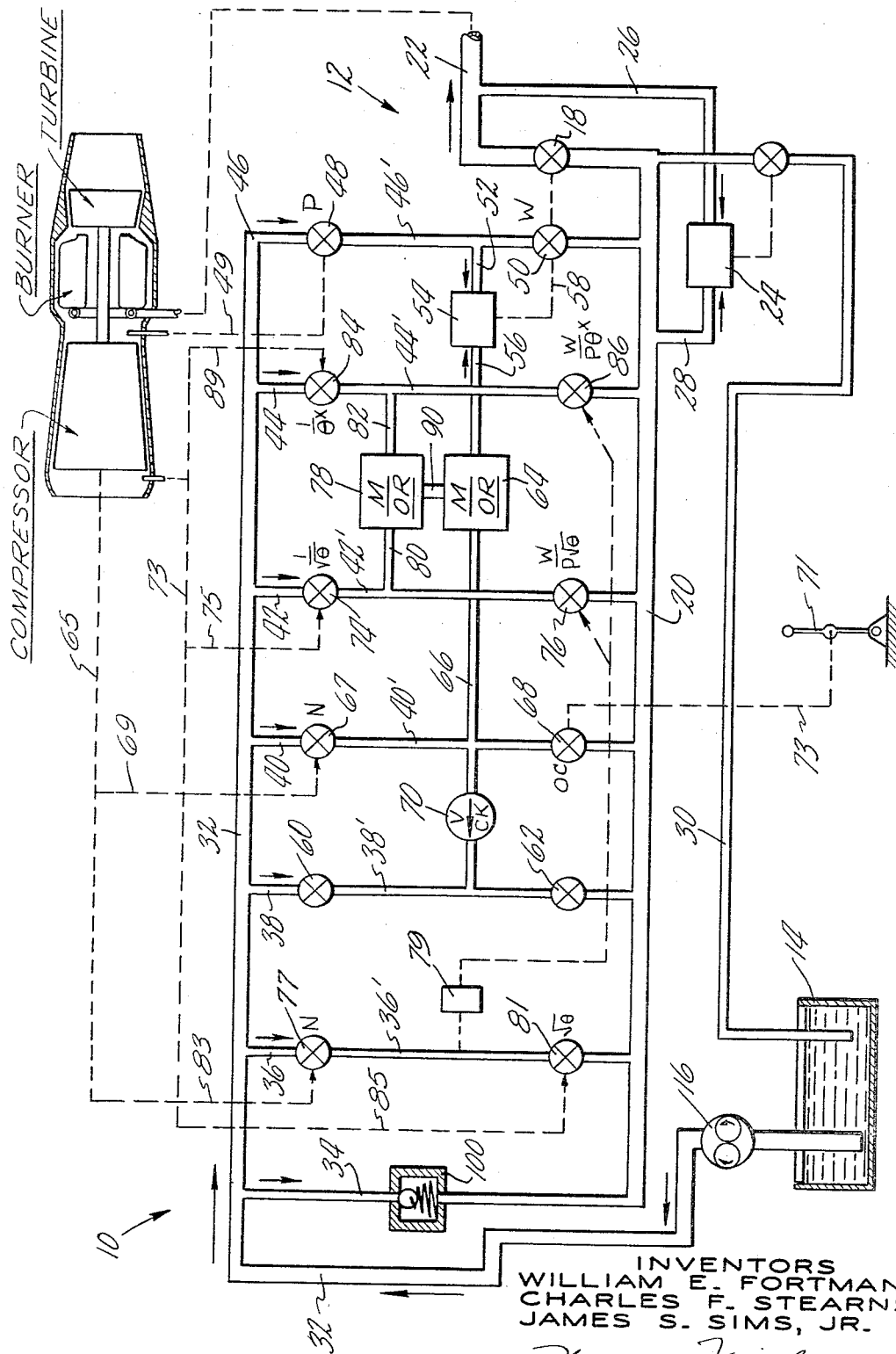

3,306,037
HYDRAULIC FUEL CONTROL
William E. Fortmann, Simsbury, Conn., Charles F. Stearns, East Longmeadow, Mass., and James S. Sims, Jr., Simsbury, Conn., assignors to United Aircraft Corporation, East Hartford, Conn., a corporation of Delaware
Filed Apr. 2, 1965, Ser. No. 445,061
11 Claims. (Cl. 60—39.28)

This invention relates to fuel controls and more particularly to fuel controls for turbine type of power plant.

This invention constitutes an improvement over the fuel control disclosed in U.S. application Ser. No. 337,837, filed on Jan. 15, 1964, and assigned to the common assignee.

As was disclosed in the referenced application above, fuel flow to the engine can be scheduled as a function of $$\frac{W_f}{P_b \theta x} \text{ vs. } \frac{N}{\sqrt{\theta}}$$

where $W_f$ = fuel flow in pounds per hour.
$P_b$ = burner pressure or compressor discharge pressure.
$\theta$ = compressor inlet temperature.
$x$ = a parameter containing terms related to burner temperature rise, compressor discharge temperature and the slope of the compressor map curves of the engine.
$N$ = compressor speed.

For a mathematical derivation of term "$x$," reference is hereby made to the above-referred-to patent application. By virtue of these parameters it is therefore possible to schedule temperature limit, surge limit, and steady state independently of each other.

The object of this invention is to utilize this basic parametric approach but applying it to a different type of computing system consisting of a network of fixed and variable restrictions wherein the basic computing element of the control is a hydraulically operated self-balancing bridge which consists of a plurality of parallel hydraulic flow paths, all of which have disposed therein two serially connected restrictions. Two flow paths are connected so that by varying the restrictions therein the bridge is balanced and the proper amount of fuel is metered to the engine. In this arrangement the ratio of the two restrictions in each line when connected to the bridge circuit equals the ratio of the two restrictions in the other line.

Another object of this invention is the provision of means for automatically switching into and out of a hydraulic bridge circuit, legs of the bridge for providing a minimum fuel flow, a steady-state operation and an acceleration operation schedule wherein the acceleration schedule includes a separate leg of the bridge for each overtemperature limit and surge limit.

Other features and advantages will be apparent from the specification and claims and from the accompanying drawing which illustrate an embodiment of the invention.

The sole figure is a diagrammatic illustration of this invention.

Referring now particularly to the sole figure which generally illustrates diagrammatically the computing and metering sections of the preferred embodiment of a fuel control wherein the computing section is generally indicated by numeral 10 and the metering section is generally indicated by numeral 12. Considering first the metering section of the fuel control, fuel from reservoir generally indicated by numeral 14, is pressurized by schematically illustrated pump 16 and delivered to valve 18 via lines 20, 32, 34, 36, 38, 40, 42, 44 and 46 where it is metered into line 22 and delivered to the engine. Pressure regulator valve 24 sensing the pressure drop across valve 18 via lines 26 and 28 serves to maintain in any suitable manner the pressure drop thereacross at a constant value. For a more detailed explanation of a constant pressure drop regulator reference is made to Patent No. 3,129,643. The excess of fuel supplied by the pump to valve 18 is bypassed back to the reservoir 14 via line 30.

As will be fully explained hereinbelow, the position of valve 18 is dictated by the computing network generally indicated by numeral 10 to supply fuel commensurate with a predetermined steady state, acceleration, and minimum fuel flow schedule.

As will be appreciated from the description to follow, the hydraulic computer bridge circuit passes fuel through a plurality of parallelly disposed fuel lines which contain serially connected orifices. At all times at least two of all of the parallel networks are interconnected for controlling the throttle valve. The computing system automatically switches in and out several of the legs of the computing circuit to perform the functions as will be hereinafter described.

As noted from the drawing, fuel is delivered to the computing circuit through inlet passage 32 which communicates with the parallelly disposed computing lines 34, 36, 38, 40, 42, 44 and 46. Hence, all the flow in inlet line 32 will pass through these parallelly disposed lines and collect in line 20 which will direct the flow either through the pressure regulator valve 24 or the throttle valve 18. In the discussion to follow, for the sake of convenience, the portion of the various flow lines in the parallel computing circuit intermediate the serially connected restrictions wil be designated as a prime of the pertinent line.

Considering for the moment the line 46 having disposed therein two serially connected valves 48 and 50 which serve to develop a pressure signal in line 52 to form one leg of the bridge which is compared in comparator 54. In this instance, valve 48 is connected to sensing mechanism schematically illustrated by line 49 for developing an area which is a function of compressor discharge pressure. Valve 50 mechanically connected to valve 18 sets up an area indicative of the position of valve 18 and since the pressure drop across valve 18 remains constant, its position is indicative of actual fuel flow being metered to the engine. From the drawing it will be noted that comparator 54 compares the pressure in line 56 and when the pressure in this line equals the pressure in line 52, valves 50 and 18 will be in position to (1) balance out the computation system, and (2) deliver the desired amount of fuel to the engine.

As schematically illustrated, the position of valve 50 is controlled by a suitable connection 58 which is indicative of the error signal produced by the comparator 54. Thus, it becomes apparent that the pressure in line 56 is a scheduled $W/P$ ratio wherein W represents fuel flow in pounds per hour and P represents a sensed pressure value at the discharge end of the engine compressor and the hydraulic pressure in line 52 is indicative of a proportion of the actual $W/P$. The remaining portion of the computing system of the fuel control serves to produce a pressure in line 56 which is indicative of the scheduled $W/P$ for steady-state, acceleration operation, and a minimum fuel flow schedule.

Next, consider the fuel being metered to the parallel line 38 which has disposed therein a pair of serially disposed fixed restrictions 60 and 62. The orifice areas of restrictions 60 and 62 are preselected so that a ratio of the two areas is indicative of the value of the desired minimum $W/P$ schedule. Since the pressure in 38' is a function of the ratio of the orifice areas of restrictions 60 and 62, the pressure of the fluid metered to the OR gate valve 64 via line 66 is indicative of the minimum $W/P$ schedule. When this value is the greater of the pressure values sensed by the OR gate valve 64, the fluid in line 66 will be in communication with line 56 and applied to one end of the comparator 54. In this manner the pressure in line 56 will at no time be allowed to go above some minimum $W/P$ scheduled value.

Next, consider the fluid passing through line 40 which has serially disposed therein valve 67 and valve 68 wherein valve 67 is positioned as a function of engine r.p.m. via schematically shown connections 65 and 69, and the valve 68 being positioned as a function of the position of the power lever 71 through schematically shown connection 73. It is therefore apparent from the foregoing that the pressure in line 40′ will be indicative of the ratio of the areas of valve 67 and valve 68 which serves to set up the desired droop line. The pressure in line 40′ communicates with line 66 upstream of one end of checkvalve 70. This pressure is compared with the pressure in line 38′ as communicated to checkvalve 70 by the interconnection of line 66 on the other side of checkvalve 70. Checkvalve 70 then allows the pressure in line 40′ to pass through whenever the pressure in line 40′ is greater than the pressure in line 38′. Hence, when the pressure in line 40′ is greater than the pressure in line 38′, valve 70 will allow flow to pass therethrough reducing the pressure in line 40′. The pressure in line 40′ is then fed through line 66 to the OR valve 64 for comparison with the pressure established in line 90 which is indicative of the $W/P$ schedule for surge and overtemperature limits. When the pressure in line 66 is greater than the pressure in line 90, it passes on to line 56, hence providing the steady-state scheduling of the computer. Obviously, the pressure in line 52 is automatically adjusted, by virtue of comparator 54 and valve 50, to equal the pressure in line 56 at which time the throttle valve 18 will be placed in the position indicative of the steady-state schedule computed by the computing system. Thus, it is apparent that the ratio of the areas of the openings of valves 67 and 68 will equal the ratio of the areas of the openings of valves 48 and 50. Stated in another way, compressor speed over the power lever position is set to equal actual $P/W$ and since valve 50 is indicative of W, valve 18 will be adjusted until the system is balanced and the proper amount of fuel is being metered to the engine as dictated by the schedule computed by the computation system 10.

In a similar manner the computer calculates the surge and temperature lines for establishing the acceleration schedule and does this independently through the parameters $\theta^x$, $\sqrt{\theta}$, $$\frac{W}{P} \times \theta$$

and $W/P\theta^x$, where $\theta$ is indicative of sensed compressor inlet temperature.

First, consider the computation of the scheduled surge line. Looking at line 42 which carries valve 74 and serially disposed valve 76 which establishes a pressure in 42′ which is indicative of the ratio of $$\frac{1}{\sqrt{\theta}} \text{ to } \frac{W}{P\sqrt{\theta}}$$

This is accomplished by positioning valve 74 as a function of compressor inlet temperature as sensed through schematically shown connections 73 and 75 so that it establishes an area equivalent to a value indicative of $1/\sqrt{\theta}$ and positioning valve 76 so that it establishes an area equivalent to the ratio of $W/P\sqrt{\theta}$. The position of valve 76 is established as a function of the pressure in line 36′ which is indicative of the ratio of speed of the compressor to the value indicative of the square root of temperature or speed corrected to some standard set of conditions. The pressure in line 36′ is established by valve 77 and valve 81. As noted from the drawing, valve 77 is positioned as a function of compressor speed through connections 65 and 83 and valve 81 is positioned as a function of compressor inlet temperature through connections 73 and 85. As schematically illustrated, the position of valve 76 is controlled by the pressure in line 36′ by a suitable pressure transducer schematically illustrated by numeral 79. The pressure established in line 42′ is indicative of the $W/P$ surge schedule and is applied to one end of the OR valve 78 via line 80. The other side of OR valve 78 is subjected to the $W/P$ overtemperature schedule signal as applied thereto through line 82 which is in communication with line 44′.

The establishment of the $W/P$ overtemperature schedule is made by regulating the pressure in line 44′ as a function of the ratio of the areas of valves 84 and 86. Valve 84 which is positioned as a function of the sensed compressor inlet temperature through schematically shown connection 89 establishes a value which is indicative of $1/\theta^x$. The exponential value of $x$ may be for instance .5 but would be dependent on the particular engine for which the fuel control is intended to be used. Like the other area sizes, the particular value of the area selected by the various valves is preascertained by contouring the port of the valve so as to meter the computing fuel in accordance with a predetermined schedule. As illustrated, valve 86 which establishes an area indicative of $W/P\theta^x$ is positioned like valve 76 as a function of the transducer 79. It is therefore apparent from the foregoing that the higher of the two pressures in lines 80 or 82 is passed on through the OR valve 78 to the OR valve 64 via line 90 which, in turn, is being compared with the pressure in line 66. The higher of the pressures in lines 66 and 90 is then passed on to line 56 for positioning valves 50 and 18 as was described hereinabove. It is therefore noted that although valves 76 and 86 are actuated by the same parameter the results obtained thereby are different due to the differences in design of the two valves.

Whenever the pressure drop across the computing circuit as established by valve 100 goes above a predetermined value, valve 100 will move to the open position to bypass flow around the other legs in the computing circuit. Hence, the pressure drop across the lines 32 and 20 will be maintained at a predetermined value.

It should be understood that the invention is not limited to the specific embodiment but may be used in other ways without departing from its spirit.

We claim:
1. For a turbine type power plant having a compressor and a turbine driving the compressor, a fuel control having a hydraulic computing system comprising a plurality of parallelly disposed fluid passages all of which communicate with a common inlet passage and a common outlet passage connected to said power plant, a fuel metering valve in said common outlet passage for regulating the fluid passing therethrough, spaced valve means serially disposed in one of said parallel disposed passages establishing a hydraulic pressure indicative of a desired $W/P$ surge schedule, where

$W$=fuel flow in pounds per hour, and
$P$=compressor discharge pressure, spaced valve means serially disposed in another of said parallel disposed passages establishing a desired $W/P$ overtemperature schedule, spaced valve means serially disposed in another of said parallel disposed passages establishing an actual $W/P$ value, and control means for comparing said actual $W/P$ value with said $W/P$ surge schedule or said $W/P$ overtemperature schedule for controlling said fuel metering valve.

2. Apparatus as claimed in claim 1 wherein said spaced valve means establishing a hydraulic pressure indicative of a desired $W/P$ surge schedule includes an arrangement whereby one of said valve means is positioned as a function of the ratio of compressor speed to the square root of compressor inlet temperature and another of said spaced valve means is positioned as a function of compressor inlet temperature.

3. Apparatus as claimed in claim 2 wherein said spaced valve means establishing a hydraulic pressure indicative of a desired $W/P$ overtemperature schedule includes an arrangement whereby one of said spaced valve means is positioned as a function of the ratio of compressor speed to the square root of compressor inlet temperature and another of said spaced valve means is positioned as a function of compressor inlet temperature so as to meter fluid as a function of a predetermined value indicative of the thermodynamic characteristics of the power plant working medium.

4. Apparatus as claimed in claim 3 wherein said spaced valve means establishing a hydraulic pressure indicative of actual $W/P$ value includes an arrangement whereby one of said spaced valve means is positioned by the compressor discharge pressure and another of said spaced valve means is connected to and movable with said fuel metering valve.

5. For a turbine type power plant having a compressor and a turbine driving the compressor, a fuel control having a hydraulic computing system comprising a plurality of parallelly disposed fluid passages all of which communicate with a common inlet passage and a common outlet passage connected to said power plant, a fuel metering valve in said common outlet passage for regulating the fluid passing therethrough, spaced valve means serially disposed in one of said parallel disposed passages establishing a hydraulic pressure indicative of a desired $W/P$ surge schedule, where $W$=fuel flow in pounds per hour, and
$P$=compressor discharge pressure, spaced valve means serially disposed in another of said parallel disposed passages establishing a desired $W/P$ overtemperature schedule, spaced valve means serially disposed in another of said parallel disposed passages establishing a desired $W/P$ steady-state schedule, spaced valve means serially disposed in another of said parallel disposed passages establishing an actual $W/P$ value, and control means for comparing said actual $W/P$ value with said $W/P$ surge schedule, said $W/P$ overtemperature schedule or said $W/P$ steady-state schedule for controlling said fuel metering valve.

6. For a turbine type power plant having a compressor and a turbine driving the compressor, a fuel control having a hydraulic computing system comprising a plurality of parallelly disposed fluid passages all of which communicate with a common inlet passage and a common outlet passage connected to said power plant, a fuel metering valve in said common outlet passage for regulating the fluid passing therethrough, spaced valve means serially disposed in one of said parallel disposed passages establishing a hydraulic pressure indicative of a desired $W/P$ surge schedule, where $W$=fuel flow in pounds per hour, and
$P$=compressor discharge pressure, spaced valve means serially disposed in another of said parallel disposed passages establishing a desired $W/P$ overtemperature schedule, spaced fixed restriction means serially disposed in another of said parallel disposed passages establishing a desired $W/P$ minimum fuel flow schedule, spaced valve means serially disposed in another of said parallel disposed passages establishing an actual $W/P$ value, and control means for comparing said actual $W/P$ value with said $W/P$ surge schedule, said $W/P$ overtemperature schedule or said $W/P$ minimum fuel flow schedule for controlling said fuel metering valve.

7. A fuel control for a turbine type power plant having a compressor, a burner and a turbine driven by the gases discharging from said burner for driving said compressor, a power lever, means for scheduling fuel to said burner during steady-state and acceleration operations of said power plant, said means including a plurality of parallel disposed fluid passages all of which communicate with a common inlet passage and a common outlet passage, the outlet passage being connected to the burner, a fuel metering valve in said outlet passage and a bypass line interconnecting the outlet passage at a point upstream of said fuel metering valve and a low pressure area, a pressure drop regulating valve in said bypass line for maintaining the pressure drop across said metering valve at a constant value, each of said parallel disposed fluid passages having at least two variable restriction means serially disposed therein, the variable restriction means in one of said parallelly disposed passages responding to a function of compressor discharge pressure and fuel flow to the engine for establishing a first hydraulic signal, the variable restriction means in another of said parallel disposed passages responding to speed of the compressor and power lever position for establishing a second hydraulic signal indicative of scheduled steady-state operation, the variable restriction means in another of said parallel disposed passages responding to compressor inlet temperature and corrected compressor speed for establishing a third hydraulic signal indicative of scheduled surge limit operation, the variable restriction means in another of said parallel disposed passages responding to compressor inlet temperature and corrected compressor speed for establishing a fourth hydraulic signal indicative of scheduled overtemperature limit operation, combining means, means for comparing and selecting either said second, third or fourth hydraulic signal for transmitting to said combining means, said combining means responding to said first signal and said second, third or fourth hydraulic signal for positioning said metering valve.

8. A fuel control for a turbine type power plant having a compressor, a burner and a turbine driven by the gases discharging from said burner for driving said compressor, a power lever, means for scheduling fuel to said burner to provide steady-state operation, acceleration operation of said power plant and for minimum fuel flow, said means including a plurality of parallel disposed fluid passages all of which communicate with a common inlet passage and a common outlet passage, the outlet passage being connected to the burner, a fuel metering valve in said outlet passage and a bypass line interconnecting the outlet passage at a point upstream of said fuel metering valve and a low pressure area, a pressure drop regulating valve in said bypass line for maintaining the pressure drop across said metering valve at a constant value, each of said parallel disposed fluid passages having at least two restriction means serially disposed therein, the restriction means in one of said parallelly disposed passages being variable and responding to a function of compressor discharge pressure and fuel flow to the engine for establishing a first hydraulic signal, the restriction means in another of said parallel disposed passages being variable and responding to speed of the compressor and power lever position for establishing a second hydraulic signal indicative of scheduled steady-state operation, the restriction means in another of said parallel disposed passages being variable and responding to compressor inlet temperature and corrected compressor speed for establishing a third hydraulic signal indicative of scheduled surge limit operation, the restriction means in another of said parallel disposed passages responding to compressor inlet temperature and corrected compressor speed for establishing a fourth hydraulic signal indicative of scheduled overtemperature limit operation, the restriction means in another of said parallel disposed passages being fixed for establishing a fifth hydraulic signal indicative of scheduled minimum fuel flow, combining means, means for comparing and selecting either said second, third, fourth or fifth hydraulic signal for transmitting to said combining means, said combining means responding to said first signal and said second, third, fourth or fifth hydraulic signal for positioning said metering valve.

9. A fuel control for a turbine type power plant having a compressor, a burner and a turbine driven by the discharge gases from the burner for driving the compressor, a power lever, a fuel metering valve for metering fuel to the burner in accordance with predetermined steady-state and overtemperature limit power plant operating schedules, means for establishing said schedules, said means including a plurality of parallelly disposed fluid passages each having a common inlet passage and a common outlet passage, said metering valve disposed in said outlet passage, one of said parallelly disposed passages having spaced first and second valves, said first valve movable as a function of compressor discharge pressure and said second valve being ganged to said fuel metering valve so that they move conjointly for establishing a first pressure signal intermediate said first and second valves, another of said parallelly disposed passages having spaced third and fourth valves, said third valve being positioned as a function of compressor speed and said fourth valve being positioned as a function of the position of said power lever for establishing a second pressure signal intermediate said third and fourth valves, another of said parallelly disposed fluid passages having spaced fifth and sixth valves, said fifth valve movable as a function of compressor speed and said sixth valve movable as a function of compressor inlet temperature to establish a third pressure signal intermediate said fifth and sixth valves indicative of the ratio of compressor speed to the square root of compressor inlet temperature, another of said parallelly disposed passages having spaced seventh and eighth valves, said seventh valve movable as a function of compressor inlet temperature and said eighth valve adapted to be moved as a function of said third signal for establishing a fourth pressure signal intermediate said seventh and eighth valves indicative of the overtemperature limit schedule, selector means adapted to receive said second and fourth pressure signals, comparator means operatively connected to said second valve, said comparator means adapted to receive either said second pressure signal or said fourth pressure signal and said first pressure signal for positioning said second valve as a function of the difference between said first pressure signal and said second or fourth pressure signals.

10. A fuel control for a turbine type power plant having a compressor, a burner and a turbine driven by the discharge gases from the burner for driving the compressor, a power lever, a fuel metering valve for metering fuel to the burner in accordance with predetermined steady-state and overtemperature limit power plant operating schedules, means for establishing said schedules, said means including a plurality of parallelly disposed fluid passages each having a common inlet passage and a common outlet passage, said metering valve disposed in said outlet passage, one of said parallelly disposed passages having spaced first and second valves, said first valve movable as a function of compressor discharge pressure and said second valve being ganged to said fuel metering valve so that they move conjointly for establishing a first pressure signal intermediate said first and second valves, another of said parallelly disposed passages having spaced third and fourth valves, said third valve being positioned as a function of compressor speed and said fourth valve being positioned as a function of the position of said power lever for establishing a second pressure signal intermediate said third and fourth valves, another of said parallelly disposed fluid passages having spaced fifth and sixth valves, said fifth valve movable as a function of compressor speed and said sixth valve movable as a function of compressor inlet temperature to establish a third pressure signal intermediate said fifth and sixth valves indicative of the ratio of compressor speed to the square root of compressor inlet temperature, another of said parallelly disposed lines having spaced seventh and eighth valves, said seventh valve movable as a function of compressor inlet temperature and said eighth valve adapted to be moved as a function of said third signal for establishing a fourth pressure signal intermediate said seventh and eighth valves indicative of the overtemperature limit schedule, another of said parallelly disposed passages having spaced fixed restrictions for establishing a fifth pressure signal intermediate thereof, selector means adapted to receive said second, fourth and fifth pressure signals, comparator means operatively connected to said second valve, said comparator means adapted to receive either said second pressure signal, said fourth, or fifth pressure signal and said first pressure signal for positioning said second valve as a function of the difference between said first pressure signal and said second, fourth, or fifth pressure signals.

11. A fuel control for a turbine type power plant having a compressor, a burner and a turbine driven by the discharge gases from the burner for driving the compressor, a power lever, a fuel metering valve for metering fuel to the burner in accordance with predetermined steady-state surge and overtemperature limit power plant operating schedules, means for establishing said schedules, said means including a plurality of parallelly disposed fluid passages each having a common inlet passage and a common outlet passage, said metering valve disposed in said outlet passage, one of said parallelly disposed passages having spaced first and second valves, said first valve movable as a function of compressor discharge pressure and said second valve being ganged to said fuel metering valve so that they move conjointly for establishing a first pressure signal intermediate said first and second valves, another of said parallelly disposed passages having spaced third and fourth valves, said third valve being positioned as a function of compressor speed and said fourth valve being positioned as a function of the position of said power lever for establishing a second pressure signal intermediate said third and fourth valves, another of said parallelly disposed fluid passages having spaced fifth and sixth valves, said fifth valve movable as a function of compressor speed and said sixth valve movable as a function of compressor inlet temperature to establish a third pressure signal intermediate said fifth and sixth valves indicative of the ratio of compressor speed to the square root of compressor inlet temperature, another of said parallelly disposed passages having spaced seventh and eighth valves, said seventh valve movable as a function of compressor inlet temperature and said eighth valve adapted to be moved as a function of said third signal for establishing a fourth pressure signal intermediate said seventh and eighth valves indicative of the overtemperature limit schedule, another of said parallelly disposed passages having spaced ninth and tenth valves, said ninth valve movable as a function of compressor inlet temperature and said tenth valve movable as a function of said third signal for establishing a fifth pressure signal intermediate said ninth and tenth valves indicative of the surge schedule, selector means adapted to receive said second and fourth pressure signals, comparator means operatively connected to said second valve, said comparator means adapted to receive either said second pressure signal, said fourth pressure signal or said fifth pressure signal and said first pressure signal for positioning said second valve as a function of the difference between said first pressure signal and said second or fourth or fifth pressure signals.

No references cited.

JULIUS E. WEST, *Primary Examiner.*